US007608320B2

(12) United States Patent
Chen

(10) Patent No.: US 7,608,320 B2
(45) Date of Patent: Oct. 27, 2009

(54) CONTAINER STRUCTURE

(75) Inventor: Sen-Yen Chen, Yung Kang (TW)

(73) Assignee: Teng Tsai Art Printing Co., Ltd., Tainan Hsien (TW)

( * ) Notice: Subject to any disclaimer, the term of this patent is extended or adjusted under 35 U.S.C. 154(b) by 656 days.

(21) Appl. No.: 11/484,783

(22) Filed: Jul. 12, 2006

(65) Prior Publication Data

US 2008/0014415 A1 Jan. 17, 2008

(51) Int. Cl.
*B32B 7/14* (2006.01)
*B29D 22/00* (2006.01)

(52) U.S. Cl. .................... 428/203; 428/209; 428/211.1; 428/423.1; 428/480; 428/483; 428/500; 428/537.5; 428/34.2; 428/34.3; 428/34.8; 428/35.3; 428/35.4; 428/35.7; 428/35.9; 428/36.9; 428/36.91; 264/259; 264/271.1; 264/275; 264/279; 264/132; 264/1.9

(58) Field of Classification Search ................ 428/34.2, 428/34.3, 34.8, 35.3, 35.4, 35.7, 35.9, 36.9, 428/36.91, 203, 209, 211.1, 423.1, 480, 483, 428/500, 537.5; 264/259, 271.1, 275, 279, 264/132, 1.9
See application file for complete search history.

(56) References Cited

U.S. PATENT DOCUMENTS

| | | | | |
|---|---|---|---|---|
| 5,223,315 | A * | 6/1993 | Katsura et al. | 428/36.92 |
| 6,069,196 | A * | 5/2000 | Akao et al. | 524/424 |
| 6,773,653 | B2 * | 8/2004 | Miller et al. | 264/447 |
| 7,514,131 | B2 * | 4/2009 | Funato et al. | 428/35.7 |
| 2001/0019761 | A1 * | 9/2001 | Iriyama | 428/200 |
| 2001/0040316 | A1 * | 11/2001 | Stewart | 264/469 |
| 2004/0217691 | A1 * | 11/2004 | Opelka et al. | 313/503 |
| 2005/0112330 | A1 * | 5/2005 | Suzuki et al. | 428/156 |
| 2005/0181204 | A1 * | 8/2005 | Wang et al. | 428/354 |
| 2006/0255492 | A1 * | 11/2006 | Yu et al. | 264/132 |

* cited by examiner

*Primary Examiner*—Betelhem Shewareged
(74) *Attorney, Agent, or Firm*—Rosenberg, Klein & Lee

(57) ABSTRACT

A container includes an image layer, and a main body; the main body is formed in a mold by means of carrying out an injection molding process while the image layer is held in the mold; thus, the main body will be directly joined to the image layer as soon as it is formed in the mold; the image layer includes an inner soft material layer, and it has veins formed thereon, which are deep owing to the existence of the inner soft material layer; images are printed on the image layer after the veins have been formed on the image layer.

7 Claims, 5 Drawing Sheets

CONTAINER STRUCTURE

BACKGROUND OF THE INVENTION

1. Field of the Invention

The present invention relates to an improvement on a container, more particularly one, which includes an image layer, and a main body formed and directly joined to the image layer in a mold by means of carrying out an injection molding process.

2. Brief Description of the Prior Art

Currently existing containers usually have beautiful images on outer sides. Referring to FIG. 5, a conventional container includes a main body 3, and an image layer 4; the main body 3 has a cup-shape with an upper opening; the image layer 4 is a plastic film with various images printed thereon, and is stuck on the main body 3 after the main body 3 is made by means of injection molding.

The above container has the following disadvantages:

1. The images on the container are two-dimensional instead of being three-dimensional therefore they aren't attractive enough.

2. The image layer will separate from the main body after the container has been used for a certain length of time because it is only stuck on the main body. Consequently, the container will become unpleasant-looking.

3. The image layer can't resist high temperature, and can be easily torn away from the main body because it is only stuck on the main body. Therefore, the container isn't convenient to use.

SUMMARY OF THE INVENTION

It is a main object of the invention to provide an improvement on a container to overcome the above-mentioned problems.

The container of the present invention includes an image layer, and a main body; the main body is formed in a mold by means of carrying out an injection molding process while the image layer is held in the mold; thus, the main body will be directly joined to the image layer as soon as it is formed in the mold. The image layer includes an inner soft material layer, and it has veins formed thereon, which are relatively deep owing to the existence of the inner soft material layer; images are printed on the image layer after the veins have been formed. Therefore, the printed layer is relatively smooth instead of being non-continuous, i.e. broken into several segments.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
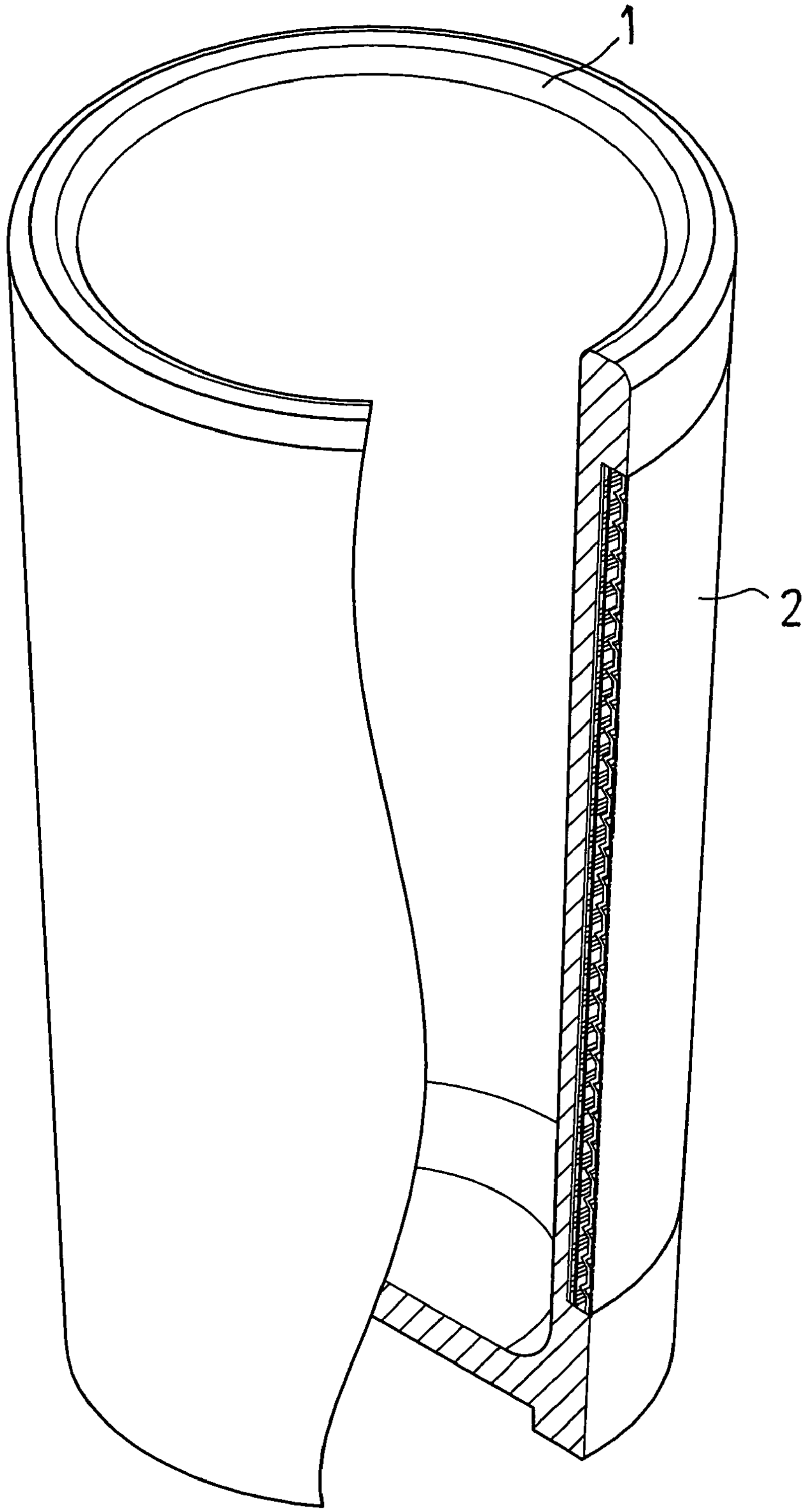
FIG. 1 is a perspective view of the present invention.
Figure 2:
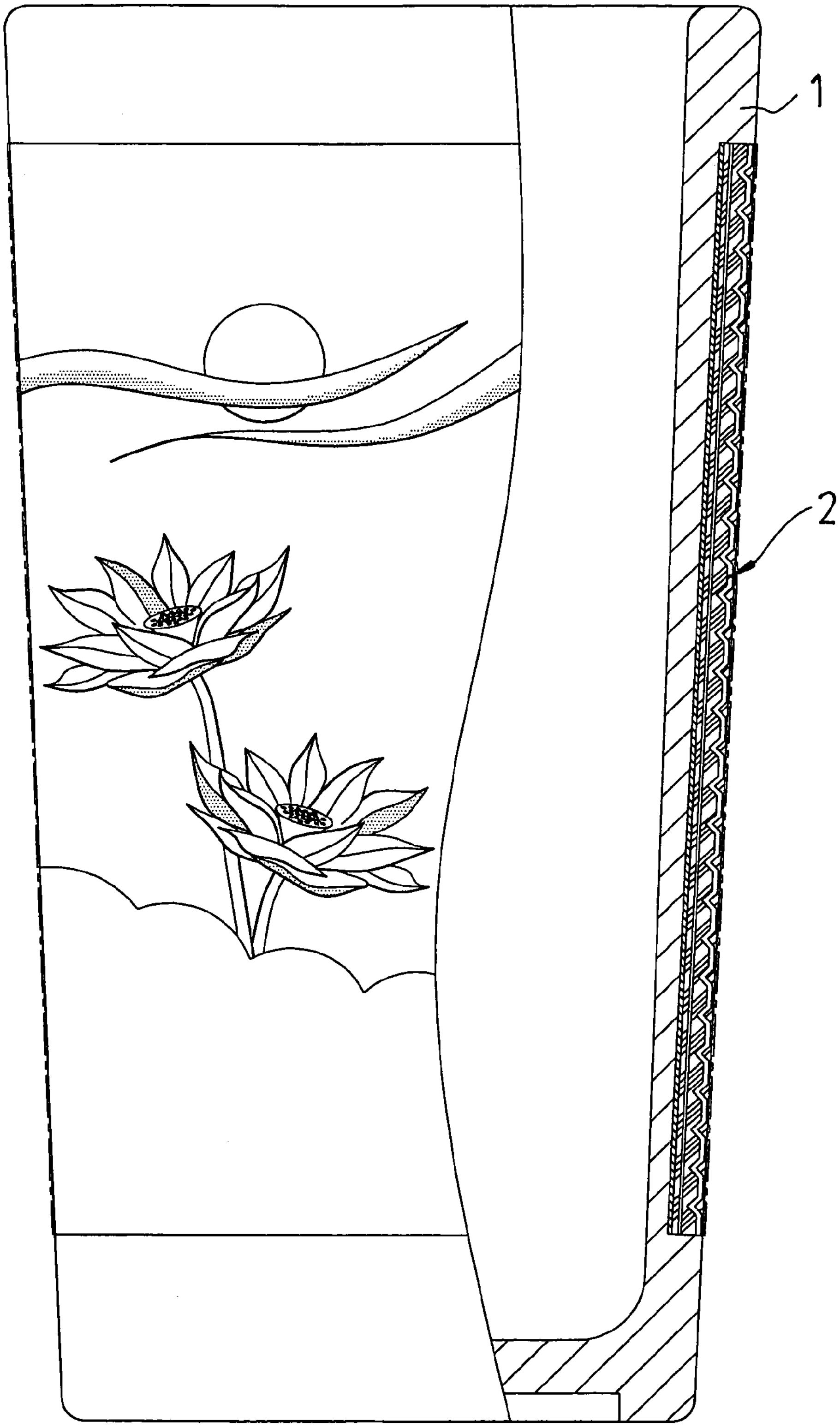
FIG. 2 is a sectional view of the present invention.
Figure 3:
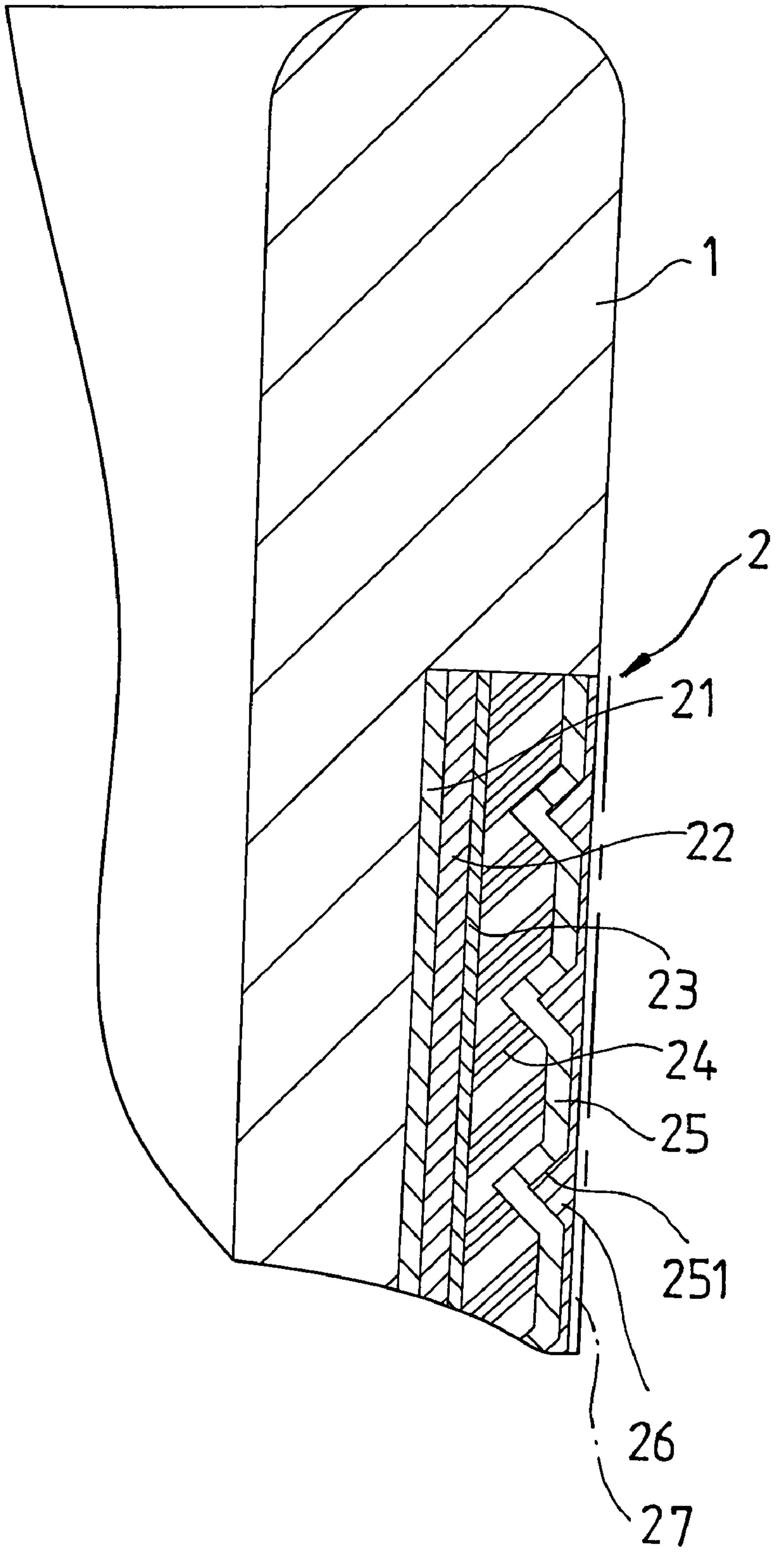
FIG. 3 is a partial enlarged view of the present invention.

Referring to FIGS. 1 and 2, a preferred embodiment of an improvement on a container structure includes a main body 1, and an image layer 2. The main body 1 is formed in a mold by means of carrying out an injection molding process while the image layer 2 is positioned in the mold; thus, the main body 1 will be directly joined to an inner side of the image layer 2 as soon as it is formed;

The image layer 2 consists of a base plate 21, a first pressing layer 22, an aluminum layer 23, a soft material layer 24, a second pressing layer 25, a printed layer 26, and a protecting layer 27. To manufacture the image layer 2, the first pressing layer 22 is stuck on the base plate 21, and the aluminum layer 23 is formed on the first pressing layer 22 by means of vacuum plating, and the soft material layer 24 is stuck on the aluminum layer 23, and the second pressing layer 25 is stuck on the soft material layer 24, and veins 251 are formed on the second pressing layer 25 by means of using pressing technique, and images are printed on the second pressing layer 25 to form the printed layer 26, and shining paint is applied over the printed layer 26 to form the protecting layer 27 in sequence. The base plate 21 can be made of paper materials, polystyrene (PS) or Polypropylene (PP). The first and the second pressing layers 22 and 25 can be made of Polyethylene terephthalate (PET) or Polypropylene (PP). The soft material layer 24 is preferably made of Polyurethane (PU). Because the soft material layer 24 is on the inner side of the second pressing layer 25, the veins 251 on the second pressing layer 25 are relatively deep, and the three-dimensional effect of the image layer 2 is increased.

Figure 4:
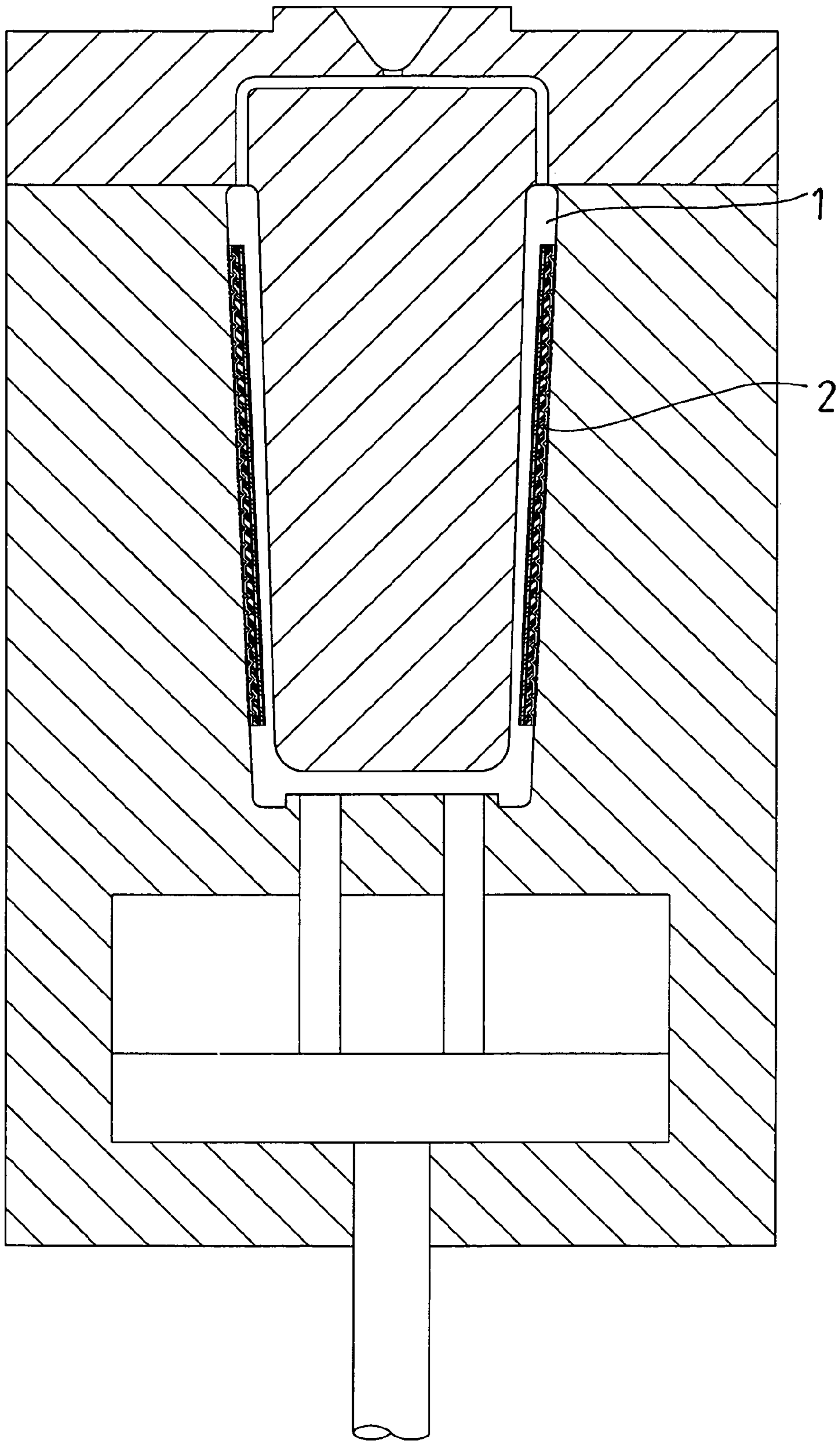
FIG. 4 is a view taken when the present invention is being manufactured.
Figure 5:
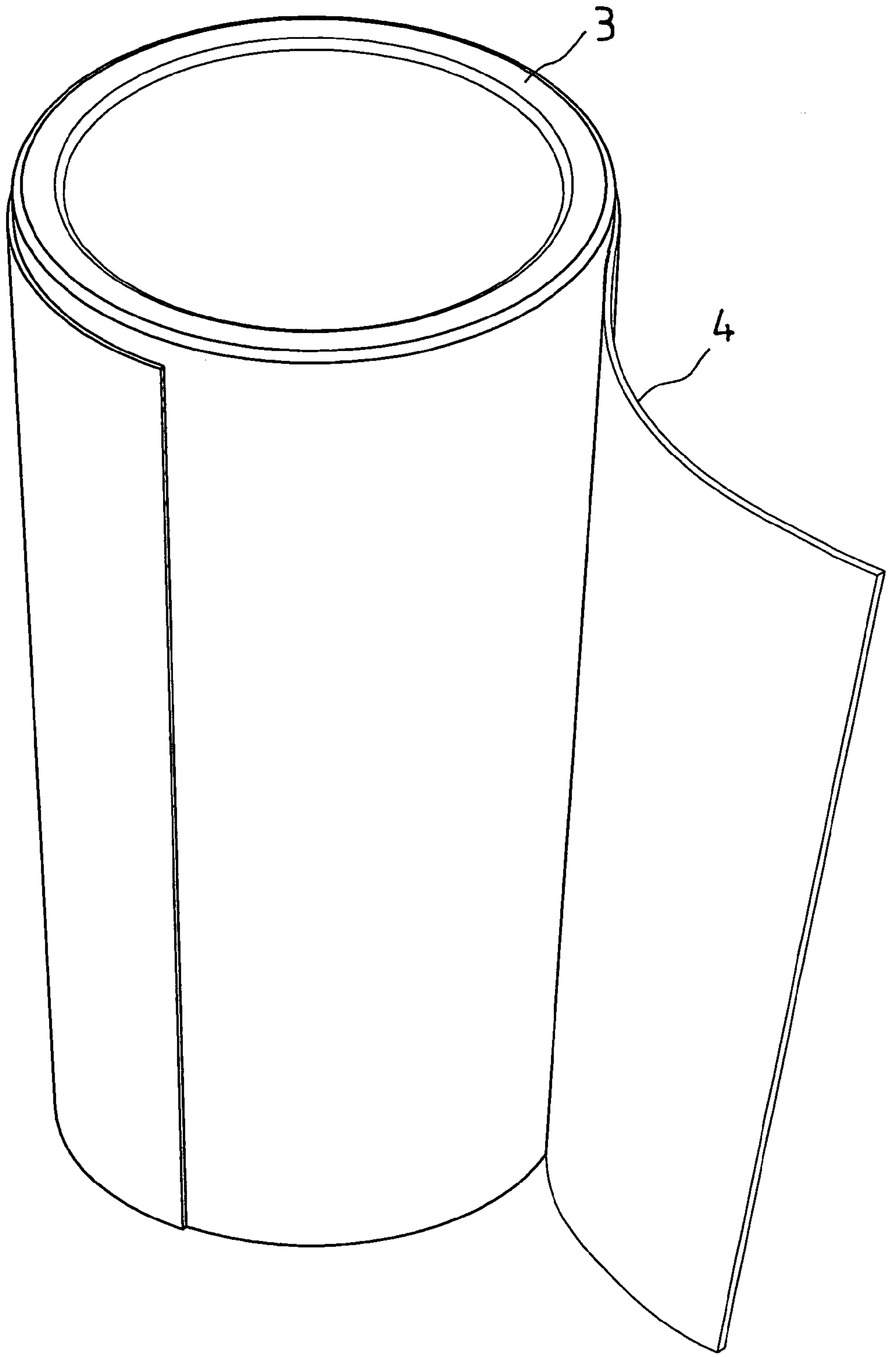
F I G. 5 (PRIOR ART)
FIG. 5 is a view of the prior art.

Referring to FIG. 4, after the image layer 2 is made, it is positioned in the mold, and injection molding is carried out to make the main body 1 of the container; thus, the image layer 2 will be directly joined to an outer side of the main body 1 in the injection molding process. Because images are printed on the second pressing layer 25 to form the printed layer 26 after the veins 251 are formed, the printed layer 26 will be relatively smooth instead of being non-continuous.

From the above description, it can be seen that the container of the present invention has the following advantages over the prior art:

1. Because the image layer is directly joined to an outer side of the main body in the injection molding process, the container of the present invention is high temperature resistant, and can't easily come apart owing to external force. Therefore, it is relatively convenient to use.

2. The image layer of the present invention has a soft material layer therein therefore the veins thereon are relatively deep.

3. The printed layer is relatively smooth instead of being non-continuous, i.e. broken into several segments, because images are printed on the second pressing layer to form the printed layer after the veins are formed on the second pressing layer.

What is claimed is:

1. An improvement on a container structure, comprising an image layer; and a main body; the main body being formed and directly joined to the image layer in a mold by means of carrying out an injection molding process;

the image layer including a base plate, a first pressing layer over an outer side of the base plate, an aluminum layer over an outer side of the first pressing layer, a soft material layer over an outer side of the aluminum layer, a second pressing layer over an outer side of the soft material layer, and a protecting layer over the second pressing layer;

the second pressing layer having a plurality of veins formed thereon; the second pressing layer having a plurality of images printed thereon after the veins are formed; shining paint being applied over the second pressing layer to form the protecting layer after the images are printed.

2. The improvement on a container structure as recited in claim 1, wherein the base plate is made of paper materials.

3. The improvement on a container structure as recited in claim 1, wherein the base plate is made of polystyrene (PS).

4. The improvement on a container structure as recited in claim 1, wherein the base plate is made of Polypropylene (PP).

5. The improvement on a container structure as recited in claim 1, wherein the first and the second pressing layers are made of Polyethylene terephthalate (PET).

6. The improvement on a container structure as recited in claim 1, wherein the first and the second pressing layers are made of Polypropylene (PP).

7. The improvement on a container structure as recited in claim 1, wherein the soft material layer is made of Polyurethane (PU).

* * * * *

UNITED STATES PATENT AND TRADEMARK OFFICE

CERTIFICATE OF CORRECTION

PATENT NO. : 7,608,320 B2
APPLICATION NO. : 11/484783
DATED : October 27, 2009
INVENTOR(S) : Sen-Yen Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twelfth Day of October, 2010

David J. Kappos

*Director of the United States Patent and Trademark Office*